O. R. CHAPLIN.
LAWN MOWER.
APPLICATION FILED MAY 12, 1910.
984,471.
Patented Feb. 14, 1911.
3 SHEETS—SHEET 1.
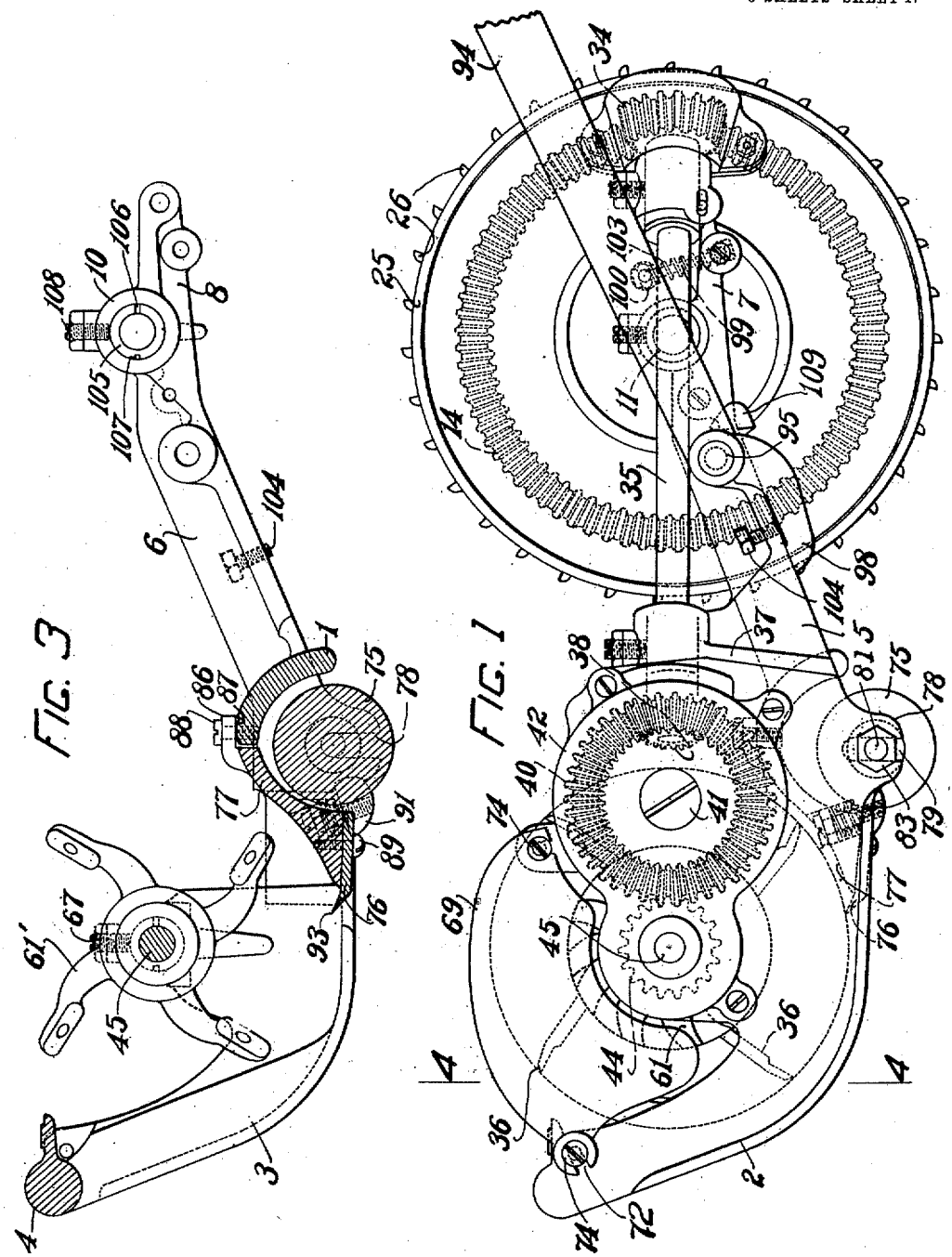
WITNESSES
A. T. Palmer
A. M. Morse
INVENTOR
ORRIL R. CHAPLIN
BY Chas. P. A. Smith
ATTY.

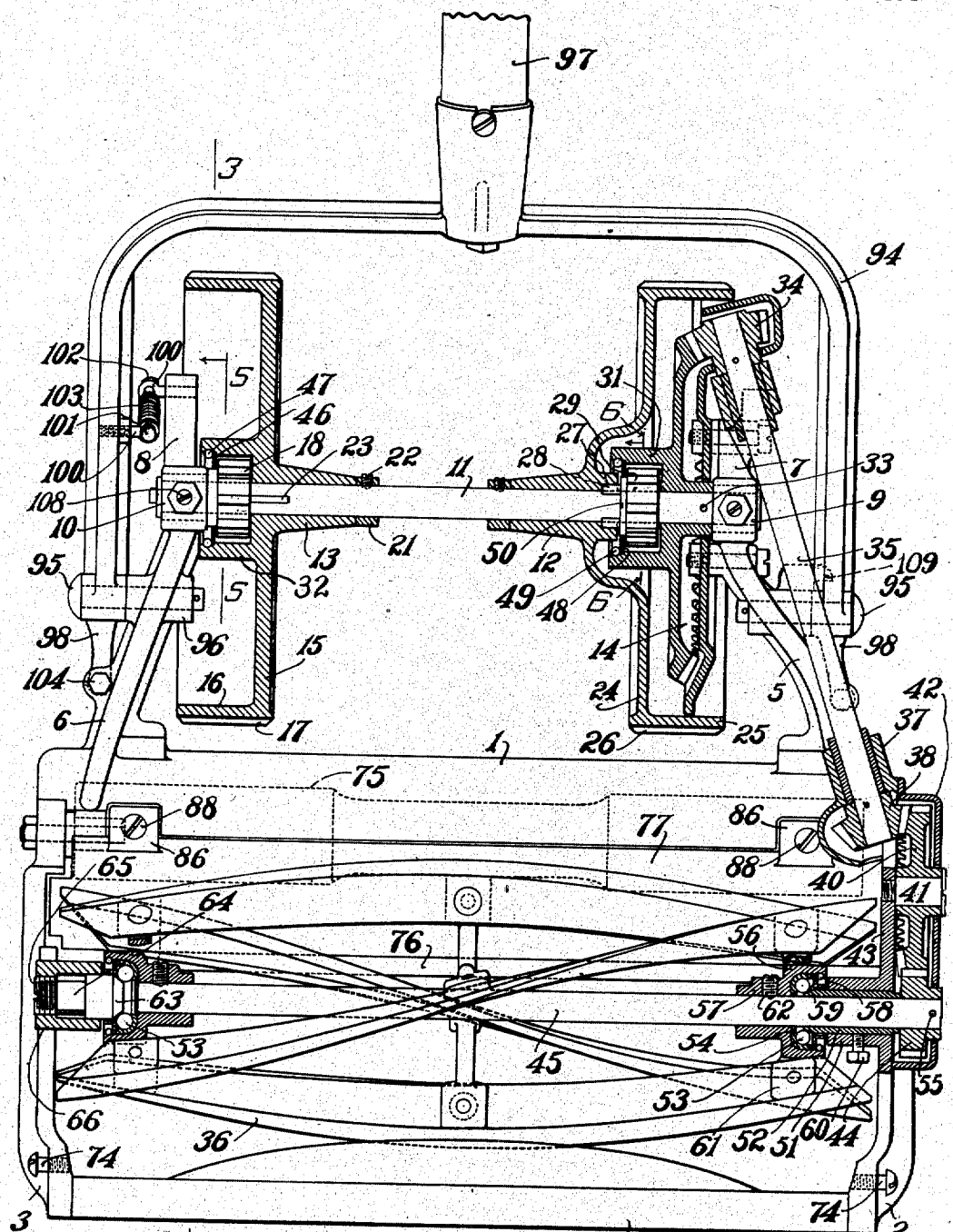

O. R. CHAPLIN.
LAWN MOWER.
APPLICATION FILED MAY 12, 1910.
984,471.
Patented Feb. 14, 1911.
3 SHEETS—SHEET 3.
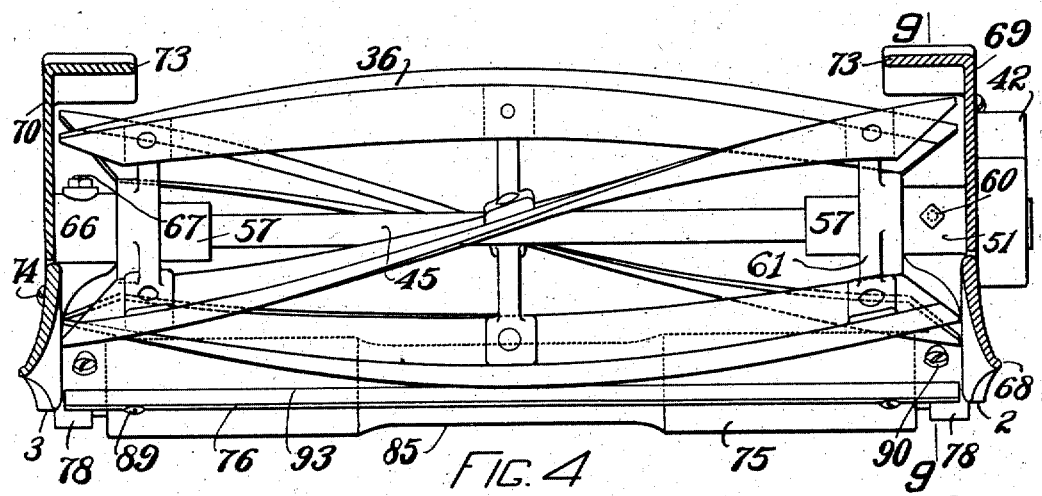
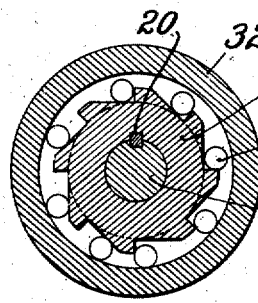
Fig. 5
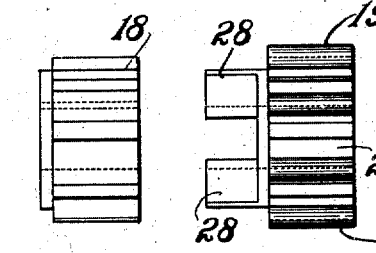
Fig. 7    Fig. 8
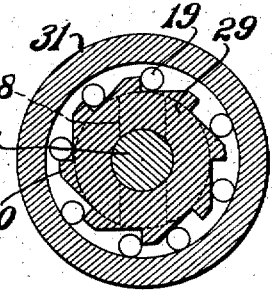
Fig. 6
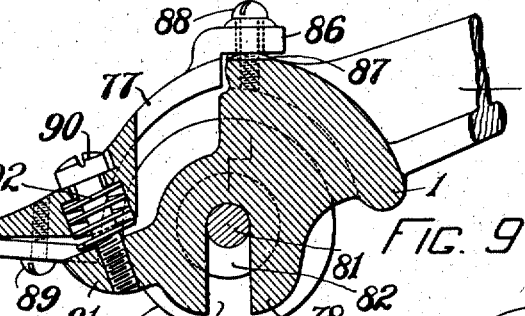
Fig. 9
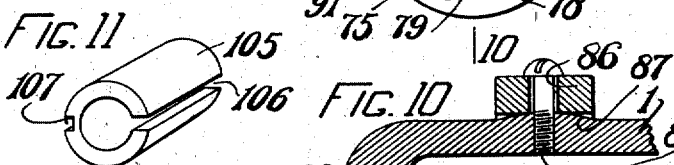
Fig. 11    Fig. 10
Fig. 12
WITNESSES
A. T. Palmer
A. M. Morse
INVENTOR
ORRIL R. CHAPLIN
BY
Chas. F. A. Smith
ATT'Y

UNITED STATES PATENT OFFICE.

ORRIL R. CHAPLIN, OF BOSTON, MASSACHUSETTS, ASSIGNOR OF ONE-HALF TO ROBERT W. HOWARD, OF BOSTON, MASSACHUSETTS.

LAWN-MOWER.

984,471.   Specification of Letters Patent.   Patented Feb. 14, 1911.

Application filed May 12, 1910.   Serial No. 561,240.

*To all whom it may concern:*

Be it known that I, ORRIL R. CHAPLIN, a citizen of the United States, residing at Boston, in the county of Suffolk and State of Massachusetts, have invented certain new and useful Improvements in Lawn-Mowers, of which the following is a specification, reference being had therein to the accompanying drawings.

My invention relates to certain improvements in lawn mowers of that type shown in my United States patent numbered 751,378 dated February 2, 1904 in which a series of rotary knives act against a stationary cutting-bar.

The object of the invention is to simplify and cheapen the construction of devices of this character and make more effective the operation thereof.

The mower is so arranged as to cut grass in a one-inch wider swath than the width of the under cutter or bed knife, thus cutting close to a wall or fence, and is provided with means for preventing cutting of flowers when the mower is being driven around the beds.

The invention consists in the constructions and combinations of parts hereinafter described and set forth in the claims.

In the accompanying drawings Figure 1 represents a side elevation of my lawn mower, the handle bar being broken away. Fig. 2 is a sectional plan of the same, also with the handle bar broken away and with the flower guards removed. Fig. 3 is a sectional elevation on the line 3—3 of Fig. 2. Fig. 4 is a cross-sectional elevation on the line 4—4 of Fig. 1. Fig. 5 is a sectional view of the clutch in the supplementary drive wheel on the line 5—5 of Fig. 2. Fig. 6 is a sectional view of the clutch in the ring formed on the large driving bevel gear on the line 6—6 of Fig. 2. Fig. 7 is a front elevation of the clutch shown in Fig. 5 with the rollers removed. Fig. 8 is a front elevation of the clutch with the rollers, shown in Fig. 6. Fig. 9 is a sectional elevation on the line 9—9 of Fig. 4. Fig. 10 is a sectional view on the line 10—10 of Fig. 9. Fig. 11 is a perspective view of one of the bushings 105. Fig. 12 is a perspective view of one of the snap retaining rings.

Like parts are represented by similar characters of reference in the several views.

My mowing machine is of that type or pattern in which a rotary cutting-reel works against an under cutter or bed knife, and in carrying out my invention I have provided a main frame which is preferably of one piece of cast metal, as it will be stronger and lighter than to have the parts bolted together, as in nearly all, if not all, of the present types of machines now on the market.

The main frame is composed of a rear bar or main frame 1, having forward-extending side arms 2 and 3, curved or bent upwardly at their outer part and connected at their extreme ends by the bar 4, so as to form a sort of inclosure for the rotary cutting reel or revolving cutter 36, protecting said cutter to a large extent from injury and forming a guard in case of children, cats, or dogs running against the forward part of the mower. Extending rearwardly from the main frame 1, (which acts as a brace or guard board for the different parts and as a guard for the supporting roller and under cutter) are the side arms 5 and 6, bent upwardly and inwardly, the extreme ends finally terminating in horizontal parallel members 7 and 8, the member 7 extending farther rearward than the corresponding member 8 to support the driving shaft 35, as hereinafter explained. These members 7 and 8 respectively form, near their rear end, journal box bearings 9 and 10, and in these boxes is journaled the axle 11, having the ground or drive wheels 12 and 13, which wheels are loose on the axle 11.

The drive wheel 13, which is the one located farthest from the driving bevel gear 14, is not the regular or main drive wheel but is a supplementary drive wheel acting as a substitute or assistant supporting wheel to keep up that side of the frame of the machine from dropping, to also prevent the machine from rocking and to drive the gearing when this wheel is being revolved forward faster than the opposite or main drive wheel 12 is being revolved forward on account of uneven surface. This drive wheel 13 consists of a web 15 formed on its hub and having the rim 16 provided with ribs 17 extending across the periphery of the rim. Within a rim or ring 32 formed on the inner side of the supplementary drive wheel and keyed to the axle is the roller friction clutch consisting of the ratchet wheel 18 and rollers 19 placed between the teeth of the ratchet wheel; the rollers being of a size to fit therein between the inner rim or ring and the ratchet wheel, so as to cause friction when the supplementary drive wheel is turned forward faster than the axle is being turned by the main drive wheel, in which case the supplementary drive wheel will turn the axle through the friction clutch at the same speed as it is being forced over the ground.

A sliding, or feather, key 20 fastened to the hub of the ratchet wheel 18 is free to slide in the key-way 23 of the axle 11. This arrangement facilitates the placing of the axle into the journal bearings after the supplementary drive wheel and clutch have been placed thereon. After the axle has been set in place, the collar 46 placed thereon and the snap ring 47 snapped into a groove in the ring 32, this wheel and its clutch are moved back into their proper positions and the collar 21 on the axle is placed against the hub of the wheel 13 and tightened thereon by the set screw 22.

The ground or main drive wheel 12 consists of a web 24 formed on its hub and having the rim 25 provided on its periphery with the small ribs 26 extending across it. On the end of the hub of this wheel, next the large driving bevel gear 14, are the narrow slots 27 across the face end of the hub to receive the lugs 28 on the side of the roller friction clutch. This clutch consists of a ratchet wheel 29, having a series of ratchet shaped teeth 30 formed upon its periphery but in a direction opposite to those on the periphery of the ratchet wheel 18. Surrounding said ratchet wheel is a metal ring 31, cast on the large driving bevel gear, and placed within the ring and between each ratchet tooth 30 is a small steel roller similar to the rollers 19 of the opposite clutch, and adapted to fill the inner side of the circle and ring causing friction in going forward. This ratchet wheel also runs loosely on the axle and it will thus be seen that as the mower is pushed forward, motion is imparted to the gearing from the main drive wheel through its clutch, and thence to the revolving cutters, but as the machine is moved backward it will not cause the cutters to operate.

It will be noticed that the main drive wheel is attached to the ratchet wheel 29 by the lugs 28 and that the rollers 19 wedge between the teeth of the ratchet wheel and the inner side of the ring 31 on the large driving bevel gear so that the gear is driven by the main drive wheel through the medium of the clutch and that the axle is not revolved by the main drive wheel in order to turn the gear but that the axle is turned forward when the gear is rotated forward because the gear is pinned to the axle and consequently if the axle is rotated by the supplementary drive wheel, faster than the main drive wheel would rotate it, the gear would be rotated at the same speed as that of the rotation of the supplementary drive wheel.

The outer portion of the inner side of the ring 31 is slightly enlarged forming a shoulder against which the collar 48, encircling the hub 50, of the ratchet wheel 29, is held in place by the split snap ring 49.

The large driving bevel gear is made fast to the axle by a steel pin 33; it is connected to the main drive wheel by the friction roller clutch; and it meshes into a pinion 34, made fast on the end of the driving shaft 35, which shaft is journaled at one end to the extreme end of the member 7 and extends diagonally across one side of the main frame and is journaled at its other end at a point above the main frame, in the rear of the cutting reel 36 to an upward extending portion 37 of the arm 5 of the main frame 1. On this end of the shaft extending through the bearing is placed and fastened a small bevel gear 38, and the side of this gear next to the side frame 43 passes through an opening cast in this web or side frame and meshes into a larger intermediate bevel gear 40 journaled to a cap stud pin 41 screwed into the upright side frame 43 between this frame and the cover plate 42. The outer end of the stud pin has a flat head or flange which covers that portion of the hub of the intermediate gear 40 that extends through the cover plate 42. This intermediate gear, which is a combined spur and bevel gear, is between the said small gear and the spur pinion 44 on the revolving cutter shaft 45 meshing with the latter. The spur and bevel teeth on this intermediate gear are combined so that each tooth extends from the side over the top, or in other words, across the periphery and partly down one side, as shown in Fig. 2.

In the forward part of the mower a revolving cutter-shaft 45 is journaled between the main side frames or arms 2 and 3. The journal bearing next to the gearing being in a journal hub 51 cast in the upward extending web or side frame 43 of the forward extending side arm 2. This cutter-shaft is ball bearing and inserted in the hub 51 next to the spur pinion is a hardened steel cone tube 52 having a tapered end which extends inward far enough to come in contact with the balls 53 in the ball cup or race 54. This tube is held in place by the set screw 60 passing through the hub 51. The cutter-shaft passes loosely through the tube far enough to receive the spur pinion pinned as at 55, to its end, and to leave a small space between the pinion and frame 43 so as the end of the tube will extend outward a sufficient distance to allow of obtaining a hold on it to remove it from the hub. There are two sets of ball bearings just alike, located one near each end, or adjacent to the end, of the cutter shaft. A circular rim or casing 56 cast on and extending out from one side of the hub 57 of the spider 61 contains within the ball cup or race 54 against which is placed a thin retaining collar 59 to prevent the balls 53 from falling out and provided with a flange encircling the tube 52 and held in place by the circular steel retaining split snap ring 58 which is sprung into a groove in the casing 56 and against the side of the collar 59.

The split snap ring 58 has a portion cut out to allow it to be sprung into a smaller circle, and the two cut ends are cut on an angle in opposite directions in order that it may be easily inserted or removed by prying against the outwardly projecting end no matter which way the ring is inserted. This is equally true of all the snap retaining rings having cut away portions used in this lawn mower.

The hub 57 is secured by the set screw 62 at the desired position on the cutter-shaft. The opposite end of the cutter-shaft is cut off on a level with the bottom of the ball cup or race at that end of the shaft. The opposite cone stem 63 has a cylindrical body portion beveled or tapered at the outer end forming a ball bearing cone for the balls 53 to run upon. The body portion carries a spindle or neck 64 having the screw head 65. The remaining parts for retaining the balls and locking this end of the cutter-shaft are similar to the parts at the other end of the cutter-shaft as the spider 61' is provided with a similar rim or casing extending out from one side of the hub and having the retaining collar locked against the end of the ball cup or race by a similar split snap retaining ring.

The hub 66 cast in the side arm 3 is milled three-fourths of the way through the hub the same diameter as the cylindrical body portion of the cone stem 63 thus forming a bearing for it. The hole is reduced in size in the remaining one-fourth and threaded to receive the screw head 65. To place the cutter-shaft, screw this cone stem backward until the end of the cylindrical body portion is even with the end of the hub 66; after the cutter-shaft is in place turn the cone stem 63 forward until the tapered outer end of the body portion comes in contact with the balls 53 then turn down the set screw 67.

The forward arms 2 and 3 are curved or bent upwardly at their outer part and on the under side to a point above the center of the cutter-reel, and from the lower end of the curve to the top the outer edge of the arm on the curve is thin or nearly a knife edge, as at 68, and from that point on the inner side of the arm it is thickened until it reaches the end of the bed knife, thus forming a wedge shape piece thicker at the end of the bed knife and tapering off to a thin edge on the front and outer edge of the arm. This same wedge shaped piece continues along the inner surface of the up curved arm from a point at the bed knife up to a point near the under side of the bar 4 in front of the cutter reel. As the thin edge of one of the arms goes between the grass and the upright surface or fence, this wedge shaped portion will draw the grass inwardly onto the bed or under cutter knife 76 to be met by the rotary cutting reel, thus cutting the grass in a one-inch wider swath than the width of the under cutter.

In order that the mower may circle around flower beds and trim the grass under the flowers I provide the guards or shields 69 and 70 which consist of upright thin plates having recesses 72 and narrow flanges 73 extending inwardly and over the ends of the rotary cutting reel to prevent the flowers dropping onto the cutter blades. These shields are attached to the arms 2 and 3 by the cap screws 74 which fit into the recesses 72, but the shape of the shields allows of their remaining in their positions upon the mower even though the screws may not be tightened down and it is apparent that they can be removed without taking the screws 74 out of the frame.

The supporting roller 75 which is partly forward of and partly covered by the rear bar or main frame 1 is also partly underneath the cutter bar 77 just back of the under cutter knife 76 so that grass is prevented from falling onto and clogging it. The frame work is provided with the ears 78 having slots 79 in which the adjusting stud pins 81 lie; the roller being provided with brass bushings 84 and journaled on the fixed stud pins which are provided with flanges 82 resting against the inner side of the ears and nuts 83 on the outside to lock the pins in place within the ears at the desired height to have the roller in a position to support and adjust the forward part of the machine so as to cut the grass at the desired height. This supporting roller in the center for about one-third of the length is reduced to a smaller diameter, or concaved as at 85, to allow the roller and mower to pass over any raised or uneven surface in the lawn coming under the center of the roller that would if the roller was of the same diameter throughout cause the machine to rock or tilt.

The cutter bar 77 is pivoted or hinged at its rear edge by the two ears 86 projecting over the top edge of the main frame 1 and each ear resting on a curved boss 87 cast on the frame so that the cutter bar can rock or pivot, it being secured in place by bolts or cap screws 88 passing loosely through the ears and into the frame, thus forming a swinging joint. The under cutter knife is secured to the under side of the cutter bar by rivets or screws 89. The cutter bar has at each end a hole through which an adjusting cap screw 90 passes loosely downward into a threaded hole in the boss 91 cast on the lower edge of the side frame and extending inward, the upper side being milled off forming a level seat for the under side of the screw head. The hole in the under side of the cutter bar is enlarged to receive the spring 92, the lower end of the spring resting on the upper side of the boss 91, the spring pressing upward in one direction and the cap screw carries the cutter bar downward in the other direction, so that a turn of the screw 90 will move the knife 76 either up or down, and the pressure of the spring 92 is so great as to cause friction enough to prevent the screw from moving or getting loose. The under cutter knife has a slightly upturned forward edge 93, so as to prevent the revolving cutters from striking the cutter bar as it passes over it, and to also, as it wears down, allow of its being ground to a thinner edge for a longer period, and to keep it sharper and prevent the so frequent use of the grinder. The cap screws going through the cutter bar and into the bosses on a slant or angle, the cutter bar is thus allowed to describe a circle on the adjusting screws and the front edge of the knife can conveniently and accurately be vertically adjusted by swinging it up or down.

A forked-shaped piece of metal casting 94 is pivotally mounted on the stud pins 95 which pins extend through the bearings 96 cast in the side arms 5 and 6 and carries at its rear end the handle bar 97, (which is shown broken away in Figs. 1 and 3) and is used to push the machine forward or draw it backward. The casting 94 forward of the stud pins is provided with the fingers 98 projecting forwardly and downwardly, which come in contact with the under side of the arms 5 and 6, so that the handle can be pressed down and the arms 5 and 6 tilted upwardly, elevating the main frame and the arms 2 and 3, raising the cutters to pass any obstacle on the ground, as a stick or rock. These fingers do not come flush against the frame but a small space is allowed between the frame and these fingers in order to oscillate the handle up or down freely.

In order to prevent the handle from swinging too far forward and to make it steadier and to limit the downward movement of the handle bar and lessen the load on the forward portion of the mower and on the supporting roller I provide a connecting means between the member 8 and the casting 94 on that side by having a pin 99 extending through the two screw eyes or screw eye bolts 100 carrying a spring 103 pressing against the inner sides of the eyes of the bolts when the handle is pressed down the head 101 on one end of the pin pressing against the outer side of the eye of one bolt and the nut 102 on the opposite threaded end of the pin pressing against the outer side of the eye of the opposite bolt.

By providing one or more adjusting screws 104 extending through one or both of the side arms 5 and 6, the mower can be operated so that the grass will be cut at a greater height from the ground. The screw is turned down to the desired position and the handle pressed down so that the finger 98 on that side comes in contact with the adjusting screw on that side and the mower operated with the handle in this position. A stop 109 also limits the upward movement of the handle.

All of the bearings in this mower have a split brass bushing 105 with a set screw 108 for tightening. A narrow groove or slot 106 is cut through the thickness of the bushing lengthwise to allow the bushing to close as the bearing wears loose. On the opposite side of the bushing is another groove 107 cut one-half way through the thickness of the bushing, and it may be cut on the inside of the circle or on the outside of the bushing. This is to make a sort of hinge to yield at this point instead of springing the whole thickness of the bushing. As the bushing wears down all that is necessary is a turn of the screw and the bushing fits tight and snug again.

Having thus described my invention, I claim—

1. In a lawn mower, the combination with a frame of a pair of twin drive wheels journaled on the rear of the frame, a revolving cutter journaled in the forward part of the frame, the frame provided forward of the cutter with side arms forwardly and upwardly inclined, a driving shaft journaled on one side of and above the frame inclined diagonally at an angle to the drive wheels, means for operating the shaft only by the fastest forward revolving drive wheel, means connecting the driving shaft and revolving cutter rearwardly of the revolving cutter shaft, removable flower guards on the forward portion of each side of the frame and extending inward far enough to cover only the ends of the blades of the revolving cutter, and the side arms beneath the flower guards being beveled at an angle to the revolving cutter nearly their entire length for forcing the uncut grass in front of the arms inwardly to be cut by the revolving cutter.

2. In a lawn mower the combination with a frame of an axle journaled on the rear of the frame, a pair of drive wheels mounted on the axle one of the wheels being the main drive wheel and the other the supplementary drive wheel, a driving shaft journaled on one side of the frame inclined diagonally to the axle, a pinion secured to the rear end of the shaft, a large bevel gear secured to the axle and in mesh with the pinion, means connecting the main drive wheel and the bevel gear whereby the shaft will be operated by the main drive wheel, means connecting the axle to which the bevel gear is secured and the supplementary drive wheel whereby the supplementary drive wheel only takes part in the driving when it is revolved forward at a faster speed than the main drive wheel is revolved forward, a revolving cutter journaled in the forward part of the frame parallel with the axle, and means connecting the forward portion of the driving shaft and the revolving cutter.

3. In a lawn mower the combination with a frame of a drive wheel journaled on the rear of the frame, a driving shaft journaled on one side of and above the frame inclined diagonally at an angle to the drive wheel, a bevel gear 38 on the forward end of the driving shaft not extending laterally beyond the framework, a revolving cutter journaled in the frame, a gear carried at one end of the revolving cutter, an intermediate gear connecting said gear and the bevel gear, a bevel gear 34 on the rear end of the driving shaft and means connecting this bevel gear 34 with the drive wheel.

4. In a lawn mower the combination with a frame of a revolving cutter journaled in the forward part of the frame, a driving shaft on one side of and above the frame and extending rearwardly and inwardly at an angle to the cutter, means connecting the forward portion of the shaft with the cutter, an axle journaled in the rear of the frame and parallel with the cutter, a pair of wheels loosely mounted on the axle one of said wheels being the main drive wheel and the other a supplementary drive wheel, a pinion on the rear portion of the shaft, a large bevel gear secured to the axle, a clutch within the gear and secured to the hub of the main drive wheel whereby the driving shaft will be revolved when the main drive wheel is revolved forward, and a clutch within the supplementary drive wheel having its teeth extending in the opposite direction to those of the clutch in the gear and keyed to the axle whereby the driving shaft will be revolved by the supplementary drive wheel when this wheel is being revolved forward faster than the main drive wheel.

5. In a lawn mower the combination with a frame having forward extending side arms, a connecting bar, an under cutter knife, a supporting roller extending nearly the width of the mower having its central portion slightly reduced in diameter, a revolving cutter, the side arms forward of the revolving cutter being beveled at an angle thereto to force uncut grass in a swath the width of the mower onto the under cutter knife, and driving means rearward of the revolving cutter so that when the mower is run close along the side of a wall the grass close to the wall is forced by one of the beveled side arms inwardly to the under cutter knife.

6. In a lawn mower the combination of a frame having a supporting roller journaled therein, a cutter bar hinged to said frame, a cutter knife rigidly attached to the cutter bar, a pressure spring at each end of the cutter bar between the frame and the cutter bar and means for adjusting the same so that the cutter knife may be kept in the desired position, substantially as shown.

7. In a lawn mower having a frame, a cutter bar pivotally mounted thereon, a cutter knife attached to the under side of the cutter bar, a pressure spring at each end of the cutter bar extending diagonally between the cutter bar and the lower portion of the frame and means extending through the spring and connecting the cutter bar and frame, substantially as shown and described.

8. In a lawn mower, a main frame provided with forward and rearward extending arms, drive wheels journaled in the rear arms, a rotary cutting reel journaled in the forward arms, a straight driving shaft inclined diagonally and extending across one side of the main frame, means connecting the ends of the driving shaft with the drive wheels and the rotary cutting reel, a roller having its central portion of less diameter than its outer portion extending across the mower beneath the main frame, a cutter bar mounted on the frame to swing above the roller, a cutter knife having an upturned beveled edge affixed to the under side of the cutter bar, an internally threaded boss on each side of the frame just forward of the roller, a cushion spring inserted between the cutter bar and each boss, and a cap screw extending through the frame and spring and into the threaded boss whereby the outer end of the cutter knife may be raised or lowered.

9. In a lawn mower having a cutter bar and a knife secured thereto, a supporting roller beneath the cutter bar and having about one-third of its central portion concaved, a pair of drive wheels mounted in the frame in the rear of the straight portions of the roller, a driving shaft extending from the outer side of one of the drive wheels diagonally to near one end of the cutter bar, a rotary cutter mounted above and forward of the cutter bar, clutches between each drive wheel and the driving shaft, a collar on one side of each clutch and a split snap ring having its ends beveled in opposite directions for retaining the collar in position, substantially as shown and described.

10. In a lawn mower, a framework, a cutter reel shaft, a spur pinion on one end of the shaft, a driving shaft inclined diagonally at an angle to the cutter reel shaft, a bevel gear not extending laterally beyond the framework on the end of the driving shaft nearest the spur pinion, and an intermediate gear parallel with and rotating in the same direction as the spur pinion and having combined spur and bevel teeth which extend across the periphery and partly down the side, the teeth on the spur pinion meshing with the spur portion of the teeth extending over the periphery and the teeth on the bevel gear meshing with the bevel portion of the teeth extending down the side, substantially as shown.

In testimony whereof I affix my signature in presence of two witnesses.

ORRIL R. CHAPLIN.

Witnesses:
 CHARLES F. A. SMITH,
 ROBERT W. HOWARD.